US012580752B2

(12) United States Patent (10) Patent No.: US 12,580,752 B2
Osborn et al. (45) Date of Patent: Mar. 17, 2026

(54) SYSTEMS AND METHODS FOR GENERATING SHARED SECRET KEY FOR TRANSACTION CARDS

(71) Applicant: Capital One Services, LLC, McLean, VA (US)

(72) Inventors: Kevin Osborn, Newton Highlands, MA (US); Srinivasa Chigurupati, Long Grove, IL (US); John Jones, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 59 days.

(21) Appl. No.: 18/403,001

(22) Filed: Jan. 3, 2024

(65) Prior Publication Data

US 2025/0219814 A1 Jul. 3, 2025

(51) Int. Cl.
*H04L 9/08* (2006.01)
*H04L 9/30* (2006.01)
(52) U.S. Cl.
CPC .............. *H04L 9/0861* (2013.01); *H04L 9/30* (2013.01)
(58) Field of Classification Search
CPC .................................................... H04L 9/0861
See application file for complete search history.

(56) References Cited

U.S. PATENT DOCUMENTS 4,683,553 A 7/1987 Mollier
4,827,113 A 5/1989 Rikuna

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |

(Continued)

FOREIGN PATENT DOCUMENTS

| | | |
|---|---|---|
| CA | 3010336 | 7/2017 |
| CN | 101192295 | 6/2008 |

(Continued)

OTHER PUBLICATIONS

Saush, "Getting information from an EMV chip card with Java," Sep. 8, 2006, WordPress, pp. 1-13.

(Continued)

*Primary Examiner* — Bradley W Holder
(74) *Attorney, Agent, or Firm* — KDW Firm PLLC; Andrew D. Kasnevich

(57) ABSTRACT

Systems and methods for generating a shared secret key for a transaction card are provided. An exemplary system can include: a transaction card including a card private key and a card public key derived from the card private key; a server including a server private key and a server public key derived from the server private key; and a user device. The user device can be configured to: open a communication field, read the card public key, transmit the card public key to the server, wherein the server generates a shared secret key from the card public key and the server private key, receive the server public key from the server, and transmit the server public key to the transaction card, wherein the card generates the same shared secret key from the server public key and the card private key.

20 Claims, 10 Drawing Sheets

(56)　　　　　References Cited

U.S. PATENT DOCUMENTS

| | | | |
|---|---|---|---|
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |

(56)        References Cited

U.S. PATENT DOCUMENTS

| | | | |
|---|---|---|---|
| 8,511,542 B2 | 8/2013 | Pan | |
| 8,511,547 B2 | 8/2013 | Rans | |
| 8,519,822 B2 | 8/2013 | Riegebauer | |
| 8,559,872 B2 | 10/2013 | Butler | |
| 8,566,916 B1 | 10/2013 | Vernon et al. | |
| 8,567,670 B2 | 10/2013 | Stanfield et al. | |
| 8,572,386 B2 | 10/2013 | Takekawa et al. | |
| 8,577,810 B1 | 11/2013 | Dalit et al. | |
| 8,583,454 B2 | 11/2013 | Beraja et al. | |
| 8,589,335 B2 | 11/2013 | Smith et al. | |
| 8,594,730 B2 | 11/2013 | Bona et al. | |
| 8,615,468 B2 | 12/2013 | Varadarajan | |
| 8,620,218 B2 | 12/2013 | Awad | |
| 8,667,285 B2 | 3/2014 | Coulier et al. | |
| 8,723,941 B1 | 5/2014 | Shirbabadi et al. | |
| 8,726,405 B1 | 5/2014 | Bailey et al. | |
| 8,740,073 B2 | 6/2014 | Vijayshankar et al. | |
| 8,750,514 B2 | 6/2014 | Gallo et al. | |
| 8,752,189 B2 | 6/2014 | De Jong | |
| 8,794,509 B2 | 8/2014 | Bishop et al. | |
| 8,799,668 B2 | 8/2014 | Cheng | |
| 8,806,592 B2 | 8/2014 | Ganesan | |
| 8,807,440 B1 | 8/2014 | Von Behren et al. | |
| 8,811,892 B2 | 8/2014 | Khan et al. | |
| 8,814,039 B2 | 8/2014 | Bishop et al. | |
| 8,814,052 B2 | 8/2014 | Bona et al. | |
| 8,818,867 B2 | 8/2014 | Baldwin et al. | |
| 8,850,538 B1 | 9/2014 | Vernon et al. | |
| 8,861,733 B2 | 10/2014 | Benteo et al. | |
| 8,870,081 B2 | 10/2014 | Olson | |
| 8,880,027 B1 | 11/2014 | Darringer | |
| 8,888,002 B2 | 11/2014 | Chesney et al. | |
| 8,898,088 B2 | 11/2014 | Springer et al. | |
| 8,934,837 B2 | 1/2015 | Zhu et al. | |
| 8,977,569 B2 | 3/2015 | Rao | |
| 8,994,498 B2 | 3/2015 | Agrafioti et al. | |
| 9,004,365 B2 | 4/2015 | Bona et al. | |
| 9,038,893 B2 | 5/2015 | Kirkham | |
| 9,038,894 B2 | 5/2015 | Khalid | |
| 9,042,814 B2 | 5/2015 | Royston et al. | |
| 9,047,531 B2 | 6/2015 | Showering et al. | |
| 9,069,976 B2 | 6/2015 | Toole et al. | |
| 9,081,948 B2 | 7/2015 | Magne | |
| 9,104,853 B2 | 8/2015 | Venkataramani et al. | |
| 9,118,663 B1 | 8/2015 | Bailey et al. | |
| 9,122,964 B2 | 9/2015 | Krawczewicz | |
| 9,129,199 B2 | 9/2015 | Spodak et al. | |
| 9,129,280 B2 | 9/2015 | Bona et al. | |
| 9,152,832 B2 | 10/2015 | Royston et al. | |
| 9,183,490 B2 | 11/2015 | Moreton | |
| 9,203,800 B2 | 12/2015 | Izu et al. | |
| 9,209,867 B2 | 12/2015 | Royston | |
| 9,251,330 B2 | 2/2016 | Boivie et al. | |
| 9,251,518 B2 | 2/2016 | Levin et al. | |
| 9,258,715 B2 | 2/2016 | Borghei | |
| 9,270,337 B2 | 2/2016 | Zhu et al. | |
| 9,275,325 B2 | 3/2016 | Newcombe | |
| 9,286,606 B2 | 3/2016 | Diamond | |
| 9,306,626 B2 | 4/2016 | Hall et al. | |
| 9,306,753 B1 | 4/2016 | Vandervort et al. | |
| 9,306,942 B1 | 4/2016 | Bailey et al. | |
| 9,324,066 B2 | 4/2016 | Archer et al. | |
| 9,324,067 B2 | 4/2016 | Van Os et al. | |
| 9,332,587 B2 | 5/2016 | Salahshoor | |
| 9,338,622 B2 | 5/2016 | Bjontegard | |
| 9,373,141 B1 | 6/2016 | Shakkarwar | |
| 9,379,841 B2 | 6/2016 | Fine et al. | |
| 9,413,430 B2 | 8/2016 | Royston et al. | |
| 9,413,768 B1 | 8/2016 | Gregg et al. | |
| 9,420,496 B1 | 8/2016 | Indurkar | |
| 9,426,132 B1 | 8/2016 | Alikhani | |
| 9,432,339 B1 | 8/2016 | Bowness | |
| 9,455,968 B1 | 9/2016 | Machani et al. | |
| 9,473,509 B2 | 10/2016 | Arsanjani et al. | |
| 9,491,626 B2 | 11/2016 | Sharma et al. | |
| 9,501,776 B2 | 11/2016 | Martin | |
| 9,553,637 B2 | 1/2017 | Yang et al. | |
| 9,619,952 B1 | 4/2017 | Zhao et al. | |
| 9,635,000 B1 | 4/2017 | Muftic | |
| 9,665,858 B1 | 5/2017 | Kumar | |
| 9,674,705 B2 | 6/2017 | Rose et al. | |
| 9,679,286 B2 | 6/2017 | Colnot et al. | |
| 9,680,942 B2 | 6/2017 | Dimmick | |
| 9,710,744 B2 | 7/2017 | Wurmfeld | |
| 9,710,804 B2 | 7/2017 | Zhou et al. | |
| 9,740,342 B2 | 8/2017 | Paulsen et al. | |
| 9,740,988 B1 | 8/2017 | Levin et al. | |
| 9,763,097 B2 | 9/2017 | Robinson et al. | |
| 9,767,329 B2 | 9/2017 | Forster | |
| 9,769,662 B1 | 9/2017 | Queru | |
| 9,773,151 B2 | 9/2017 | Mil'shtein et al. | |
| 9,780,953 B2 | 10/2017 | Gaddam et al. | |
| 9,891,823 B2 | 2/2018 | Feng et al. | |
| 9,940,571 B1 | 4/2018 | Herrington | |
| 9,949,065 B1 | 4/2018 | Zarakas | |
| 9,953,323 B2 | 4/2018 | Candelore et al. | |
| 9,961,194 B1 | 5/2018 | Wiechman et al. | |
| 9,965,632 B2 | 5/2018 | Zarakas | |
| 9,965,756 B2 | 5/2018 | Davis et al. | |
| 9,965,911 B2 | 5/2018 | Wishne | |
| 9,977,890 B2 | 5/2018 | Alberti | |
| 9,978,056 B2 | 5/2018 | Seo | |
| 9,978,058 B2 | 5/2018 | Wurmfeld et al. | |
| 9,990,795 B2 | 6/2018 | Wurmfeld | |
| 10,007,873 B2 | 6/2018 | Heo | |
| 10,013,693 B2 | 7/2018 | Wyatt | |
| 10,043,164 B2 | 8/2018 | Dogin et al. | |
| 10,075,437 B1 | 9/2018 | Costigan et al. | |
| 10,121,130 B2 | 11/2018 | Pinski | |
| 10,129,648 B1 | 11/2018 | Hernandez et al. | |
| 10,133,979 B1 | 11/2018 | Eidam et al. | |
| 10,210,505 B2 | 2/2019 | Zarakas | |
| 10,217,105 B1 | 2/2019 | Sangi et al. | |
| 10,242,368 B1 | 3/2019 | Poole | |
| 10,296,910 B1 | 5/2019 | Templeton | |
| 10,332,102 B2 | 6/2019 | Zarakas | |
| 10,360,557 B2 | 7/2019 | Locke | |
| 10,380,471 B2 | 8/2019 | Locke | |
| 10,395,244 B1 | 8/2019 | Mossler | |
| 10,453,054 B2 | 10/2019 | Zarakas | |
| 10,474,941 B2 | 11/2019 | Wurmfeld | |
| 10,475,027 B2 | 11/2019 | Guise | |
| 10,482,453 B2 | 11/2019 | Zarakas | |
| 10,482,457 B2 | 11/2019 | Poole | |
| 10,489,774 B2 | 11/2019 | Zarakas | |
| 10,489,781 B1 | 11/2019 | Osborn | |
| 10,510,070 B2 | 12/2019 | Wurmfeld | |
| 10,515,361 B2 | 12/2019 | Zarakas | |
| 10,535,068 B2 | 1/2020 | Locke | |
| 10,546,444 B2 | 1/2020 | Osborn | |
| 10,581,611 B1 | 3/2020 | Osborn | |
| 10,664,830 B1 | 5/2020 | Rule | |
| 10,685,349 B2 | 6/2020 | Brickell | |
| 10,797,882 B2 | 10/2020 | Rule | |
| 10,880,741 B2 | 12/2020 | Zarakas | |
| 10,909,525 B1 | 2/2021 | Dhodapkar | |
| 10,970,691 B2 | 4/2021 | Koeppel | |
| 10,984,416 B2 | 4/2021 | Ilincic | |
| 11,037,136 B2 | 6/2021 | Rule | |
| 11,062,098 B1 | 7/2021 | Bergeron | |
| 11,120,453 B2 | 9/2021 | Rule | |
| 11,138,593 B1 | 10/2021 | Ho | |
| 11,138,605 B2 | 10/2021 | Aabye | |
| 11,176,540 B2 | 11/2021 | Gupta | |
| 11,188,908 B2 | 11/2021 | Locke | |
| 11,216,806 B2 | 1/2022 | Mossler | |
| 11,258,595 B2 * | 2/2022 | Nix | H04W 52/0235 |
| 11,297,958 B2 | 4/2022 | Vukich | |
| 11,334,872 B2 | 5/2022 | Phillips | |
| 11,361,173 B2 | 6/2022 | Edwards | |
| 11,392,933 B2 | 7/2022 | Mossler | |
| 11,392,935 B2 | 7/2022 | Suresh | |
| 11,416,844 B1 | 8/2022 | Osterkamp | |
| 11,423,392 B1 | 8/2022 | Ho | |

(56)  References Cited

U.S. PATENT DOCUMENTS

| | | |
|---|---|---|
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger et al. |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer et al. |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller et al. |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |

(56)        References Cited

U.S. PATENT DOCUMENTS

| | | |
|---|---|---|
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef et al. |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein et al. |
| 2015/0088757 A1 | 3/2015 | Zhou et al. |
| 2015/0089586 A1 | 3/2015 | Ballesteros |
| 2015/0113271 A1 | 4/2015 | Jooste et al. |
| 2015/0134452 A1 | 5/2015 | Williams |
| 2015/0134513 A1 | 5/2015 | Olson et al. |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins et al. |
| 2015/0205379 A1 | 7/2015 | Mag et al. |
| 2015/0254637 A1 | 9/2015 | Yang |
| 2015/0302409 A1 | 10/2015 | Malek |
| 2015/0317295 A1 | 11/2015 | Sherry et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'H et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0026787 A1* | 1/2018 | Le Saint ................. H04L 9/321 |
| | | 713/155 |
| 2018/0034507 A1 | 2/2018 | Wobak et al. |

(56) References Cited

U.S. PATENT DOCUMENTS

| | | | |
|---|---|---|---|
| 2018/0039986 A1 | 2/2018 | Essebag et al. | |
| 2018/0039987 A1 | 2/2018 | Molino | |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0191501 A1 | 7/2018 | Lindemann | |
| 2018/0198606 A1* | 7/2018 | Le Saint | H04L 9/14 |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0172055 A1 | 6/2019 | Hale | |
| 2019/0238517 A1 | 8/2019 | D'Agostino et al. | |
| 2019/0303945 A1 | 10/2019 | Mitra | |
| 2021/0004806 A1 | 1/2021 | Noe | |
| 2021/0272098 A1 | 9/2021 | Delsuc et al. | |
| 2021/0304189 A1 | 9/2021 | Gupta | |
| 2021/0351923 A1* | 11/2021 | Nix | H04L 9/3247 |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| EP | 3534565 A1 | 9/2019 |
| GB | 2 457 221 | 8/2009 |
| GB | 2 516 861 | 2/2015 |
| GB | 2 551 907 | 1/2018 |
| KR | 101508320 | 4/2015 |
| KR | 20150140132 A | 12/2015 |
| WO | 199910824 A1 | 3/1999 |
| WO | WO 00/49586 | 8/2000 |
| WO | WO 2006070189 | 7/2006 |
| WO | WO 2008055170 | 5/2008 |
| WO | 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | 2017047855 A1 | 3/2017 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |
| WO | 2019022585 A1 | 1/2019 |
| WO | 2020181161 A1 | 9/2020 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

(56) References Cited

OTHER PUBLICATIONS

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared-: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVco, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

Smart Card Alliance, "Co-Branded Multi-Application Contactless Cards for Transit and Financial Payment," A Smart Card Alliance Transportation Council White Paper (40 pages), Mar. 2008.

Emvco: "EMV Card Personalisation Specification", Aug. 1, 2021, pp. 1-114, Retrieved from the Internet: URL: https://www.emvco.com/specification/?post_id=12467.

The International Search Report and Written Opinion mailed Mar. 3, 2025, for Int. App. No. PCT/US2024/062387 (15 pages).

Author Unknown, "Global expansion of card tapping mobile OTP for security and convenience is imminent," Jun. 28, 2022, website: https://www.swidch.com/blogs/card-tapping-motp-blog.

EMVco, LLC, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

* cited by examiner

System 100

200

Method 500

505 Generate a public key and a private key of a server

510 Receive a public key of card

515 Generate a shared secret key

520 Store the public key of card

525 Store the shared secret key

Method 600

Diagram 700

Method 800

Method 900

Method 1000

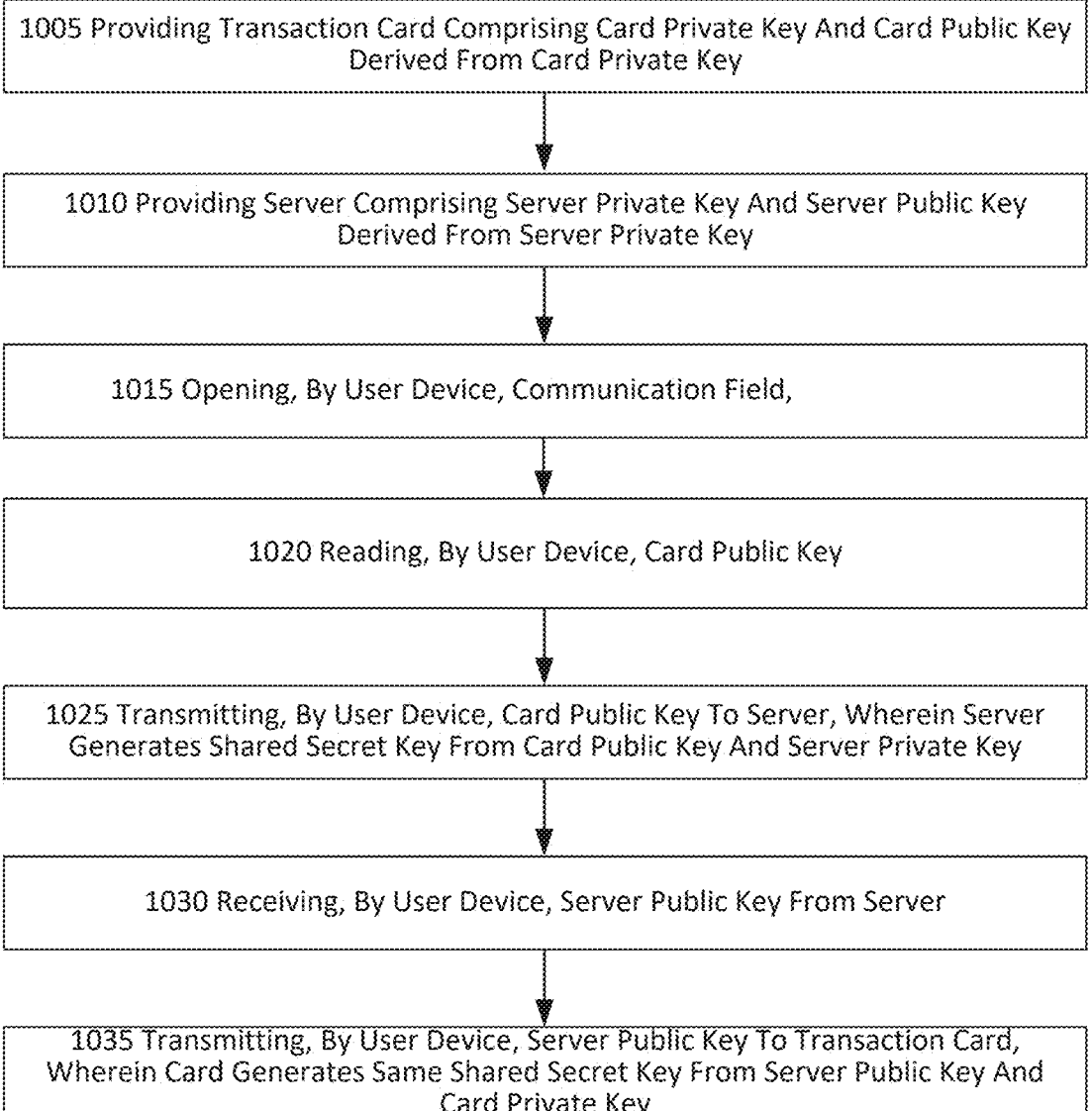

1005 Providing Transaction Card Comprising Card Private Key And Card Public Key Derived From Card Private Key 1010 Providing Server Comprising Server Private Key And Server Public Key Derived From Server Private Key 1015 Opening, By User Device, Communication Field, 1020 Reading, By User Device, Card Public Key 1025 Transmitting, By User Device, Card Public Key To Server, Wherein Server Generates Shared Secret Key From Card Public Key And Server Private Key 1030 Receiving, By User Device, Server Public Key From Server 1035 Transmitting, By User Device, Server Public Key To Transaction Card, Wherein Card Generates Same Shared Secret Key From Server Public Key And Card Private Key

FIG. 10

SYSTEMS AND METHODS FOR GENERATING SHARED SECRET KEY FOR TRANSACTION CARDS

FIELD OF THE INVENTION

The present disclosure relates generally to data security, and more particularly, to systems and methods for generating shared secret key for transaction cards.

BACKGROUND

Transaction cards can be authenticated using symmetric keys between the card itself and a backend server. In a conventional system, when the card is issued, the card is provisioned with a shared secret key, and the server has the shared secret key as well. They each use the shared secret key to create the symmetric keys. Typically, these shared secrete keys are generated and stored on the card itself before the card is issued to a user.

However, these conventional methods are inconvenient for some situations. For example, when a transaction card is being re-issued or a new transaction card is issued at a vending machine, a new shared secret key is typically needed for that re-issued card or the new card. This requires transmitting the new shared secret key between that re-issued card or the new card and the back end server, which poses security risks.

These and other deficiencies exist. Accordingly, there is a need to provide systems and methods that overcome these deficiencies to dynamically generate shared secret keys between a transaction card and a back end server.

SUMMARY

In some aspects, the techniques described herein relate to a system for generating a shared secret key for a transaction card, the system including: a transaction card including a card private key and a card public key derived from the card private key; a server including a server private key and a server public key derived from the server private key; and a user device configured to: open a communication field, read the card public key, transmit the card public key to the server, wherein the server generates a shared secret key from the card public key and the server private key, receive the server public key from the server, and transmit the server public key to the transaction card, wherein the card generates the same shared secret key from the server public key and the card private key.

In some aspects, the techniques described herein relate to a method for generating a shared secret key for a transaction card, the system including: providing a transaction card including a card private key and a card public key derived from the card private key; providing a server including a server private key and a server public key derived from the server private key; and opening, by a user device, a communication field, reading, by the user device, the card public key, transmitting, by the user device, the card public key to the server, wherein the server generates a shared secret key from the card public key and the server private key, receiving, by the user device, the server public key from the server, and transmitting, by the user device, the server public key to the transaction card, wherein the card generates the same shared secret key from the server public key and the card private key.

In some aspects, the techniques described herein relate to a non-transitory computer readable medium containing computer executable instructions that, when executed by a computer hardware arrangement, cause the computer hardware arrangement to perform procedures including: opening a communication field; reading, from a card upon entering the communication field, the card public key; transmitting, the card public key to a server, wherein the server generates a shared secret key from the card public key and the server private key; receiving, the server public key from the server, and transmitting, the server public key to the transaction card, wherein the card generates the same shared secret key from the server public key and the card private key.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

FIG. 10 is a flow chart of a method for dynamically generating a shared secret key between a transaction card and a back end server according to an example embodiment.

DETAILED DESCRIPTION OF EXAMPLE EMBODIMENTS

Figure 1:
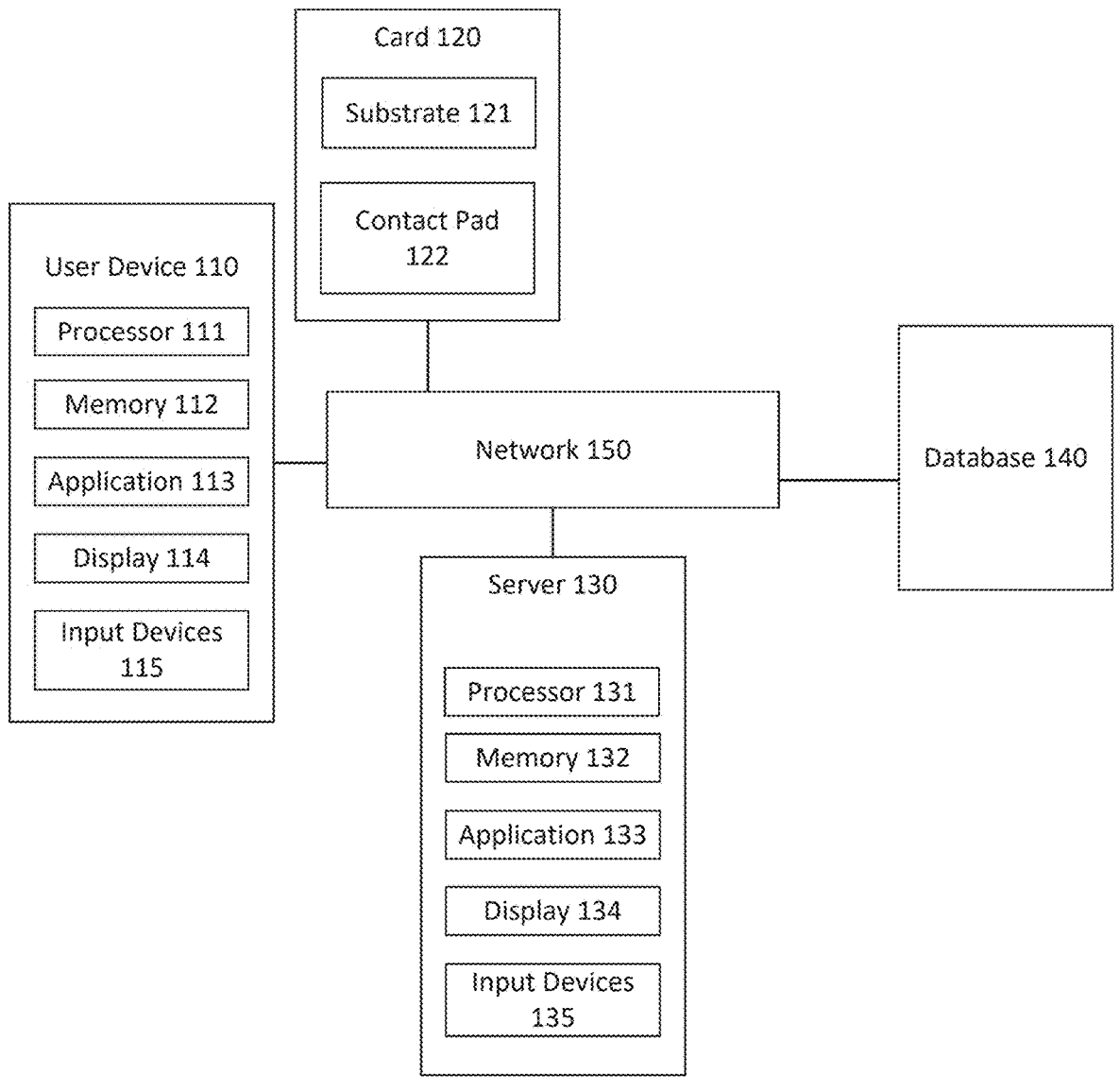
FIG. 1 is a diagram of a system for dynamically generating shared secret keys between a transaction card and a back end server according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The described features and teachings of the embodiments may be combined in any suitable manner. A person of ordinary skill in the art will recognize that the embodiments may be practiced without one or more of the specific features and teachings of an embodiment. In other instances, additional features and teachings may be recognized in certain embodiments that may not be present in all embodiments. A person of ordinary skill in the art will understand that the described features and teachings of any embodiment can be interchangeably combined with the features and teachings of any other embodiment.

Secret keys can be diversified at card manufacturing time to create the symmetric keys that are associated with transaction cards and with an identity of users. There can have applications for this identity assertion and card authentication to work with mobile devices acting as the card authenticator. Mobile devices have secure elements that can store and handle the secret keys for the message authentication code (MAC) construction and encryption, however, provisioning of those keys to both the mobile device and the back end validation systems in a secure way is challenging.

The present disclosure provides shared secret key agreement protocol and subsequent key handling methods. In the present disclosure, any number of key agreement protocols such as Diffie-Hellman or elliptic-curve Diffie Hellman (ECDH) can be used to create a secret key in parallel on the mobile device side and the back end validation server side. These key agreement protocols can use split components where one component is shared with the other side, but the other component is held secret. Both parties end up computing the same shared secret to create a shared secret key. The shared secret keys can then be provisioned into the mobile device's secure element/keychain and/or the transaction card.

On the back end server validation side, the generated shared secret keys can be encrypted with a key encryption key and stored in a database associated with the identity of the user associated with the mobile device. The identity of the user may be established with multifactor authentication, or authority endorsement before accepting this association.

For validation by the back end server, a transaction card message can be parsed and the unique identification number (UID) of the transaction card is looked up. The encrypted keys included in the transaction card message are provisioned to the hardware security module (HSM) of the back end server, and the appropriate decryption and MAC validation can be performed in the HSM based on the shared secret key that was already stored in the HSM or is dynamically generated at that moment.

In addition to the ECDH, example embodiments of the present disclosure can be implemented with any other number of secret key algorithm, such as triple data encryption algorithm (3DES), and advanced encryption standard (AES).

FIG. 1 illustrates a system 100 for dynamically generating a shared secret key between a transaction card and a back end server according to an example embodiment. As further discussed below, the system 100 may comprise a user device 110, a card 120, a server 130, a database 140, and a network 150. Although FIG. 1 illustrates single instances of the components, the system 100 may include any number of components.

The user device 110 may be associated with a user who is issued the card 120. The user device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 110 may include a processor 111, a memory 112, and an application 113. The processor 111 may be a processor, a microprocessor, or other processor, and the user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 112 may be configured to store one or more software applications, such as the application 113, and other data, such as user's shopping and financial account information.

The application 113 may comprise one or more software applications comprising instructions for execution on the user device 110. In some examples, the user device 110 may execute one or more applications, such as software applications, that enable, for example, network communications with one or more components of the system 100, transmit and/or receive data, and perform the functions described herein. Upon execution by the processor 111, the application 113 may provide the functions described in this specification, specifically to execute and perform the steps and functions in the process flows described below. For example, the application 113 may be executed to perform authenticating the user. Such processes may be implemented in software, such as software modules, for execution by computers or other machines. The application 113 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, microphone, digital camera, video recorder or camcorder. These devices may be used to enter information and interact with the software and other devices described herein.

The system 100 may include a card 120 which is further explained below with reference to FIG. 3 and FIG. 4. The card 120 may be any type of card, such as a contactless card, a security card, a payment card, an identification card, and the like. The card 120 may be issued to the user by a financial institution.

The card 120 can be configured to transmit a unique card identifier and a cryptographic payload including a cryptogram to the user device 110 upon tapping to the user device 110. The user device 110 may be configured to read the unique card identifier and the cryptographic payload including the cryptogram from the card 120 after entry of the card 120 into a communication field of the user device 110. The user device 110 may then transmit the unique card identifier and the cryptographic payload including the cryptogram to the server 130.

The card 120 can perform authentication and numerous other functions that may otherwise require a user to carry a separate physical token in addition to the card 120. By employing a contactless interface, the card 120 may be provided with a method to interact and communicate between a user's device (such as a mobile phone or the user device 110) and the card itself. For example, the Europay, Mastercard, and Visa (EMV) protocol, which underlies many credit card transactions, includes an authentication process which suffices for operating systems for Android® but presents challenges for iOS®, which is more restrictive regarding near field communication (NFC) usage, as it can be used only in a read-only manner. Exemplary embodiments of the card 120 described herein can utilize NFC technology. The card 120 may comprise a substrate 121 and a contact pad 122. Details of an example contactless card 120 will be described in FIGS. 3 and 4.

The server 130 may be a back end server associated with an institution, such as a financial institution that issues the card 120, and can be configured to communicate with the user device 110. The institution associated with the server 130 may issue the card 120 to the user and accordingly may authenticate the user based on the card 120.

The server 130 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 130 may include a processor 131, a memory 132, and an application 133. The processor 131 may be a processor, a microprocessor, or other processor, and the server 130 may include one or more of these processors. The processor 131 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 131 may be coupled to the memory 132. The memory 132 may be a read-only memory, write-once read-multiple memory or read/write memory, e.g., RAM, ROM, and EEPROM, and the server 130 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 132 may be configured to store one or more software applications, such as the application 133, and other data, such as user's financial account information and the contactless card information.

The application 133 may comprise one or more software applications, such as a card authentication module, comprising instructions for execution on the server 130. In some examples, the server 130 may execute one or more applications, such as software applications, that enable, for example, network communications with one or more components of the system 100, transmit and/or receive data, and perform the functions described herein. Upon execution by the processor 131, the application 133 may provide the functions described in this specification, specifically to execute and perform the steps and functions in the process flows described below. For example, a card authentication module of the application 133 may be executed to perform authenticating the user based on the contactless card 120. Such processes may be implemented in software, such as software modules, for execution by computers or other machines. The application 133 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 130 may further include a display 134 and input devices 135. The display 134 may be any type of device for presenting visual information such as a computer monitor, a flat panel display, and a mobile device screen, including liquid crystal displays, light-emitting diode displays, plasma panels, and cathode ray tube displays. The input devices 135 may include any device for entering information into the server 130 that is available and supported by the server 130, such as a touch-screen, keyboard, mouse, cursor-control device, microphone, digital camera, video recorder or camcorder. These devices may be used to enter information and interact with the software and other devices described herein.

The database 140 may be one or more databases configured to store date, including without limitation, private information of users, financial accounts of users, contactless card information, online merchant account information, transactions of users, and merchant records indicative of corresponding merchants. The database 140 may comprise a relational database, a non-relational database, or other database implementations, and any combination thereof, including a plurality of relational databases and non-relational databases. In some examples, the database 140 may comprise a desktop database, a mobile database, or an in-memory database. Further, the database 140 may be hosted internally by the server 130 or may be hosted externally of the server 130, such as by a server, by a cloud-based platform, or in any storage device that is in data communication with the server 130.

The system 100 may include one or more networks 150. In some examples, the network 150 may be one or more of a wireless network, a wired network or any combination of wireless network and wired network, and may be configured to connect the user device 110, the card 120, the server 130, and the database 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the user device 110, server 130, and card 120 using the network 150 can occur using one or more front channels and one or more secure back channels. A front channel may be a communication protocol that employs a publicly accessible and/or unsecured communication channel such that a communication sent to the user device 110, server 130, and/or card 120 may originate from any other device, whether known or unknown to the user device 110, server 130, and/or card 120, if that device possesses the address (e.g., network address, Internet Protocol (IP) address) of the user device 110, server 130, and/or card 120. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the user device 110, server 130, and/or card 120 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

Figure 2:
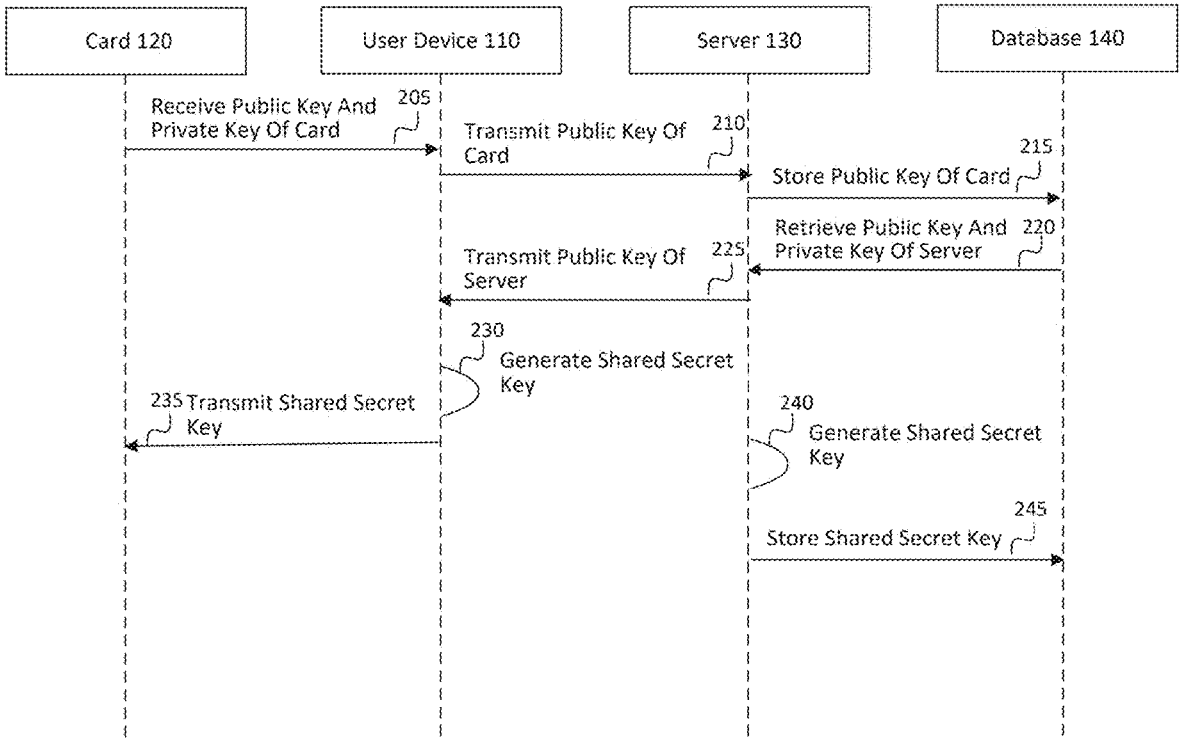
FIG. 2 is a diagram of a sequence of interactions between components of the system in FIG. 1 according to an example embodiment.

FIG. 2 illustrates an example diagram 200 of sequence of interactions between the components of the system 100 according to an example embodiment. FIG. 2 may reference the same or similar components as those illustrated in FIG. 1, including a user device, a server, a database, and a card.

When a user is issued a card such as the card 120, the card is provisioned with a master key, a card unique identification number, a card public key and a card private key pairing with the card public key. The user may tap the card 120 to the user device 110. Upon tapping the card 120, the user device 110 may transmit an NFC prompt and/or query to the card 120. The user device 110 may include an NFC interface configured for establishing an NFC communication with other NFC-equipped devices (the card 120 in this embodiment). In some of these embodiments, the NFC interface of the user device 110 may be or include an NFC receiver configured for selectively activating a magnetic field for use in establishing near field communication with an NFC transmitter. The NFC interface of the user device 110 is configured for establishing NFC communication when a passive NFC tag or other NFC-enabled device is brought into the magnetic field and within the NFC communication range of the user device 110. The NFC interface of the user device 110 is configured, in particular, for communication with the NFC-enabled card 120 when the card 120 is brought within a communication range of the user device 110 (such as, the card 120 is tapped by the user to the user device 110). As used herein, a tap of the card 120 to the user device 110 may not indicate that the card 120 is in a physical contact with the user device 110. A tap of the card 120 to the user device 110 may refer to entry of the card 120 into the NFC communication field of the user device 110. In response, the card 120 can transmit the card public key and the card private key to the user device 110. Accordingly, the user device 110, at step 205, can receive the card public key and the card private key of the card 120.

At step 210, the user device 110 may transmit the card public key of the card 120 to the server 130. Because it is the card public key, there have no security concerns of transmitting the card public key through the network 150 to the server 130.

At step 215, the server 130 may store the card public key of the card 120 to the database 140. At step 220, the server 130 may retrieve from the database 140 a server public key and a server private key pairing with the server public key.

At step 225, the server 130 may transmit the server public key of the server to the user device 110. As used herein, the card public key and the card private key of the card 120 and the server public key and the server private key of the server 130 are key pairs suitable for key agreement protocols such as elliptic curve cryptography.

At step 230, the user device 110 can generate a shared secret key based on the server public key of the server 130 and the card private key of the card 120. At step 235, the user device 110 may transmit the shared secret key to the card 120. The card 120 can store the shared secret key on the card 120.

At step 240, the server 130 may generate the same shared secret key independently based on the server private key of the server 130 and the card public key of the card 120. At step 245, the server 130 may store the same shared secret key on the database 140.

As described, transaction cards can be provisioned with a card unique identification number and a master key when the transaction cards are manufactured. The transaction cards are based on a symmetric cryptography system that relies on diversified keys diversified from such as the master key, the card unique identification number and a shared secret key. However, transmitting a shared secret key between a transaction card and a back end validation server can be exposed to data security risk. In the present disclosure, a same shared secret key can be independently generated by a user device and a back end validation server through key agreement protocols, which can improve data security.

The present disclosure allows dynamically generating shared secret keys and diversifying other keys after transactions cards are issued to users. For example, a card can be newly issued to a user or re-issued to a user on a vending machine. Exemplary embodiments of the present disclosure can securely unlock the card and allow for storing a new shared secret key and other new diversified keys in the card. The card can be unlocked by the user device or a reader of the vending machine.

A protocol such as ECDH can be used to generate a shared secret key for the card and for validation that can then be stored on the card. By applying the ECDH, a user device/a card can provide a public key associated with the card to a back end server while keeping a private key associated with the card, likewise, the back end server can provide a public key associated with the back end server to the user device/ the card while keeping a private key associated with the back end server. A same shared secret key can be dynamically and separately generated by the user device/the card and the back end server. For example, as shown in FIG. 2, the user device/the card can use the public key associated with the back end server and the private key associated with the card to generate the same shared secret key, and likewise, the back end server can use the public key associated with the card and the private key associated with the back end server to generate the same shared secret key independently. In this way, the shared secret key is not needed to be transmitted between the back end server and the user device/the card, which can improve data security.

The shared secret key can be stored in the card. The shared secret key can also be stored in the back end server for validation of the card. Preferably, the back end server can store the components that will be needed to regenerate the shared secret key for validation of the card, such as storing the public key associated with the card and the private key associated with the back end server in the HSM of the back end server. Firmware may be needed for the HSM of the back end server to recreate the shared secret key and other diversified keys on the back end server. For example, the HSM may need to implement specific key diversification algorithms for generating a shared secret key and other diversified keys on the back end server. The specific key diversification algorithms can include static ECDH to maintain a consistent shared secret key for the card. The specific key diversification algorithms can also include seed keys to derive the keys.

In some embodiments, multifactor authentication of a user may be performed on a user device in order to generate a shared secret key for a card. For example, the multifactor authentication may include login credentials (user name and password) of the user, a one-time passcode, and so forth.

Figure 3:
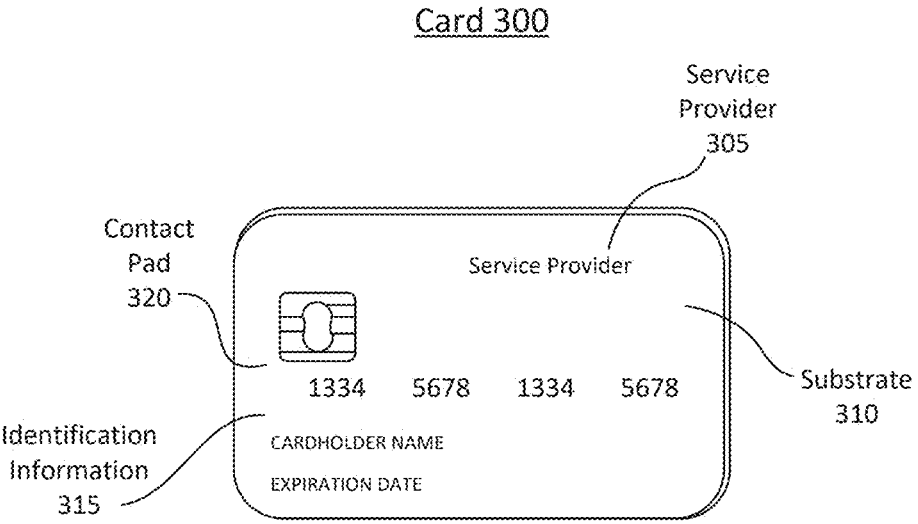
FIG. 3 is a contactless card that can be used for enhancing transaction messages for fraud prevention according to an example embodiment.

FIG. 3 describes a contactless card 300 that can be used in the system 100 of FIG. 1. For example, the card 120 in FIG. 1 can be the contactless card 300 described herein. The contactless card 300 is configured to communicate with the user device 110 of system 100. The contactless card 300 may comprise a payment card, such as a credit card, debit card, or gift card, issued by a service provider 305 (such as a bank associated with the server 130) displayed on the front or back of the contactless card 300. In some examples, the contactless card 300 is not related to a payment card, and may comprise, without limitation, an identification card, a membership card, and a transportation card. In some examples, the contactless card 300 may comprise a dual interface contactless payment card.

The contactless card 300 may comprise a substrate 310, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card 300 may otherwise be compliant with the ISO/IEC 14443 standard. However, it is understood that the contactless card 300 according to the present disclosure may have different characteristics, and the present disclosure does not require the contactless card 300 to be implemented in a payment card.

The contactless card 300 may also include identification information 315 displayed on the front and/or back of the contactless card 300, and a contact pad 320. The contact pad 320 may be configured to establish contact with another communication device, such as a user device, smart phone, laptop, desktop, point of sale (POS), a vending machine, or tablet computer. The contactless card 300 may also include processing circuitry, antenna and other components. These components may be located behind the contact pad 320 or elsewhere on the substrate. The contactless card 300 may also include a magnetic strip or tape, or an EMV integrated circuitry chip, which may be located on the back of the contactless card 300.

Figure 4:
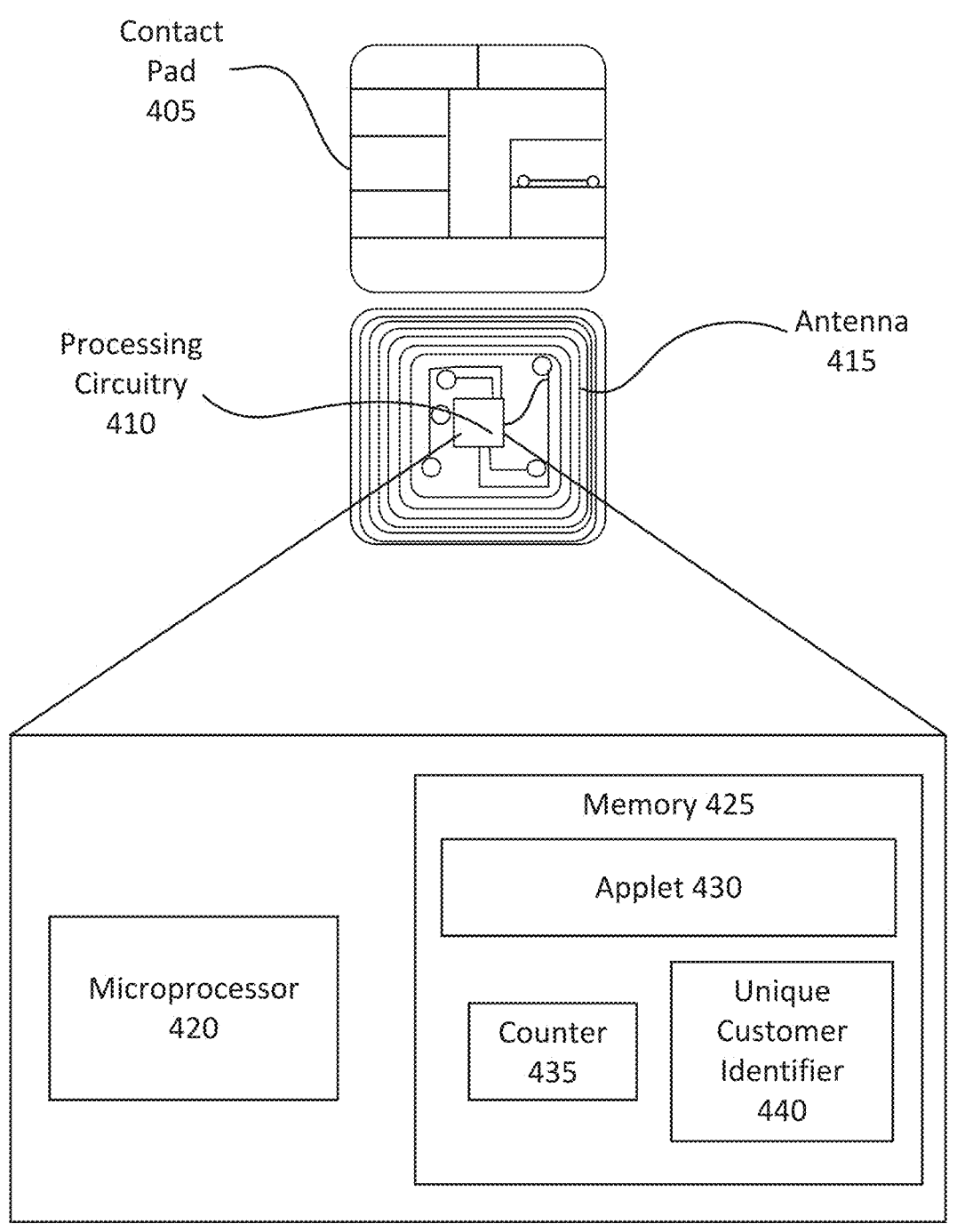
FIG. 4 is a diagram of the processor of the contactless card in FIG. 3 according to an example embodiment.

FIG. 4 illustrates an example contact pad 405 of the contactless card 300. The contact pad 405 of the contactless card 300 may include processing circuitry 410 for storing and processing information, including a processor 420 and a memory 425. It is understood that the processing circuitry 410 may contain additional components, including processors, memories, error and parity/CRC checkers, data encoders, anticollision algorithms, controllers, command decoders, security primitives and tamperproofing hardware, as necessary to perform the functions described herein.

The memory 425 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

In some embodiments, the memory 425 may also have stored public and private card encryption keys. In some embodiments, the private and public encryption keys may be permanently hard-wired into the memory 425. In various embodiments, the memory 425 may have stored therein instructions for generating encrypted information and transmitting it to a receiving device (e.g., the user device 110). Such encrypted information may be or include an encrypted verification block or signature that may be used to authenticate and verify the presence of the card 300 during transaction processing. In some embodiments, encrypted information may be unique to a particular communication (e.g., a particular NFC transmission by the card 300).

The memory 425 may be configured to store one or more applets 430, one or more counters 435, and a unique customer identifier 440 (also referred to a card unique identification number as above). The one or more applets 430 may comprise one or more software applications configured to execute on one or more contactless cards, such as Java Card applet. However, it is understood that the one or more applets 430 are not limited to Java Card applets, and instead may be any software application operable on contactless cards or other devices having limited memory. The one or more applets 430 may comprise an EMV applet. The one or more counters 435 may comprise a numeric counter sufficient to store an integer. The unique customer identifier 440 may comprise a unique alphanumeric identifier assigned to a user of the contactless card 300, and the identifier may distinguish the user of the contactless card 300 from other contactless card users. In some examples, the customer identifier 440 may identify both a customer and an account assigned to that customer and may further identify the contactless card 300 associated with the customer's account.

The processor 420 and memory 425 elements of the foregoing exemplary embodiments are described with reference to the contact pad 405, but the present disclosure is not limited thereto. It is understood that these elements may be implemented outside of the contact pad 405 or entirely separate from it, or as further elements in addition to the processor 420 and the memory 425 elements located within the contact pad 405.

In some examples, the contactless card 300 may comprise one or more antennas 415. The one or more antennas 415 may be placed within the contactless card 300 and around the processing circuitry 410 of the contact pad 405. For example, the one or more antennas 415 may be integral with the processing circuitry 410 and the one or more antennas 415 may be used with an external booster coil. As another example, the one or more antennas 415 may be external to the contact pad 405 and the processing circuitry 410.

In an embodiment, the coil of contactless card 300 may act as the secondary of an air core transformer. A terminal (such as the user device 110) may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless card 300 may be built on a software platform operable on smart cards or other devices having limited memory, such as JavaCard, and one or more or more applications or applets (applet 430) may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (the user device 110), and produce an NDEF message that comprises a cryptographically secure OTP encoded as an NDEF text tag.

The contactless card 300 may be configured for communication with the user device 110 via a communication interface configured for establishing communication with the user device 110. The communication interface may be configured for contact-based communication, in which case the interface may have electrical circuitry and contact pads on the surface of the card 300 for establishing direct electrical communication between the card 300 and the user device 110. Alternatively or in addition, the communication interface may be configured for contactless communication with the user device 110. In such embodiments, the communication interface may be or include an NFC communication interface configured for communication with other NFC communication devices when the card 300 is within a predetermined NFC range. In some embodiments, the card 300 may include a second communication interface configured for establishing short range communication with the user device 110 via Bluetooth, or other short range communication methodology. In such embodiments, the card 300 may have a short range communication antenna that is included in or connected to the short range communication interface. The card 300 may also include a power management system for use in managing the distribution of power during an NFC transaction.

Figure 5:
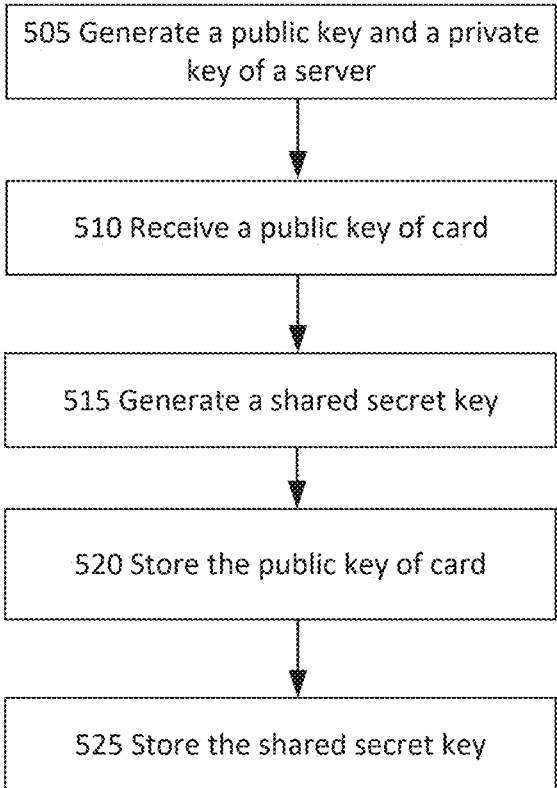
FIG. 5 is a flow chart of a method for dynamically generating a shared secret key for a transaction card on the back end server side according to an example embodiment.

FIG. 5 illustrates a flow chart of a method for dynamically generating a shared secret key for a transaction card on the back end server side according to an example embodiment. FIG. 5 may reference the same or similar components as those illustrated in FIGS. 1-4, including a user device, a server, a database, and a contactless card. The method 500 can be implemented in the system 100 and may include, but is not limited to, the following steps.

At step 505, the server 130 may generate a public key and a private key of the server 130. The public key and the private key of the server 130 can be a key pair suitable for key agreement protocols such as elliptic curve cryptography.

At step 510, the server 130 may receive a public key of the card 120, from the user device 110. The public key of the card 120 is provisioned on the card 120 when the card 120 is manufactured. Upton tapping the card 120 to the user device 110, the card 120 can transmit the public key of the card 120 to the user device 110. The user device 110 can then transmit the public key of the card 120 to the server 130.

At step 515, the server 130 may generate a shared secret key based on the private key of the server 130 and the public key of the card 120 by using a key agreement protocol such as ECDH.

At step 520, the server 130 may store the public key of the card 120 on the database 140, such that the same shared secret key can be regenerated by the server 130 based on the public key of the card 120 when the card 120 is validated for future transactions.

At step 525, the server 130 may further store the shared secret key on the database 140. Although the shared secret key can be stored on the database 140 for later validation of the card 120, the same shared secret key may be preferably regenerated when validating the card 120 in the future.

Figure 6:
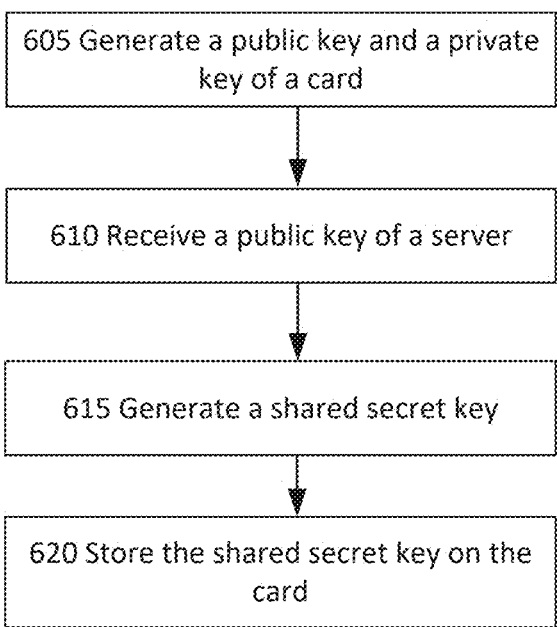
FIG. 6 is a flow chart of a method for dynamically generating a shared secret key for a transaction card on the transaction card side according to an example embodiment.

FIG. 6 illustrates a flow chart of an example method 600 for dynamically generating a shared secret key for a transaction card on the transaction card side according to an example embodiment. FIG. 6 may reference the same or similar components as those illustrated in FIGS. 1-5, including a user device, a server, a database, and a contactless card. The method 600 can be implemented in the system 100 and may include, but is not limited to the following steps.

At step 605, a public key and a private key of the card 120 is generated. When a user is issued the card 120, the card 120 can be provisioned with a master key, a card unique identification number, the public key and the private key of the card 120. The user may tap the card 120 to the user device 110. Upon tapping the card 120, the card 120 may transmit to the user device 110 the public key and the private key of the card 120.

At step 610, the user device 110 may receive a public key of the server 130. The private key of the server 130 is kept by the server 130, such as on the database 140.

At step 615, the user device 110 can generate a shared secret key based on the public key of the server 130 and the private key of the card 120. The shared secret key can be generated using a key agreement protocol such as ECDH based on the public key of the server 130 and the private key of the card 120.

At step 620, the user device 110 may transmit the shared secret key to the card 120. The card 120 can store the shared secret key on the card 120.

Figure 7:
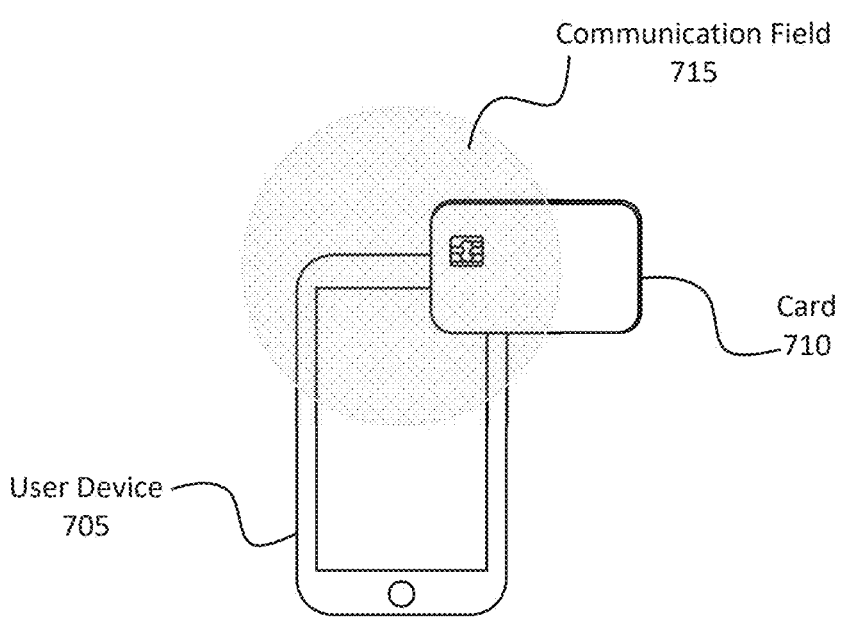
FIG. 7 is a diagram of tapping a transaction card to a mobile device according to an example embodiment.

FIG. 7 illustrates a diagram 700 of tapping a transaction card to a mobile device according to an example embodiment. FIG. 7 may reference the same or similar components as those illustrated in FIGS. 1-6, including a user device, a server, a database, and a contactless card.

FIG. 7 illustrates near field communication (NFC) according to an exemplary embodiment. Generally, NFC is the transmission of data through electromagnetic radio fields which enable two or more devices to communicate with each other without touching. NFC operates at 13.56 MHz on ISO/IEC 18000-3 air interface and at rates ranging from 106 kbit/s to 424 kbit/s. When two NFC-enabled devices are placed within a very small distances (e.g. a few centimeters), they can perform a transaction of information. NFC is beneficial to consumer transactions because it allows for near instantaneous reading of information. The receiving device reads the transmitted data the instant that it is sent. Therefore, human error is greatly reduced. Additionally, NFC reduces the time need to read a card. Rather than swipe a card through a reader, a consumer can simply touch the card or user device to an NFC enabled reader. Additionally, NFC reduces the risk of interference from fraudulent parties. Because NFC devices may communicate only over a very short distance, it is extremely difficult to intercept the information being sent between the devices.

Some examples of NFC communication include NFC card emulation where smartphones act like smart cards allowing users to perform transactions such as payment. As another example, NFC reader/writer communication allows devices to read information stored on NFC tags embedded into labels or smart posters. As another example, NFC peer-to-peer communication allows two NFC-enabled devices to communicate with each other to exchange information.

NFC standards cover communications protocols and data exchange formats, and are based on existing RFID standards including ISO/IEC 14443 and FeliCa. The standards include ISO/IEC 18092 and those defined by the NFC Forum.

In FIG. 7, a user device 705 (such as the user device 110) and a contactless card 710 (such as the card 120) are interacting within an NFC field 715. The user device 705 is further explained with reference to FIG. 1. The contactless card 710 is further explained with reference to FIGS. 3 and 4. Both the user device 705 and contactless card 710 may be enabled with NFC technology. The user device 705 and the card 710 are in close contact with each other so that they can exchange information within the communication field 715, for example by tapping the contactless card 710 to the user device 705 as described above.

Figure 8:
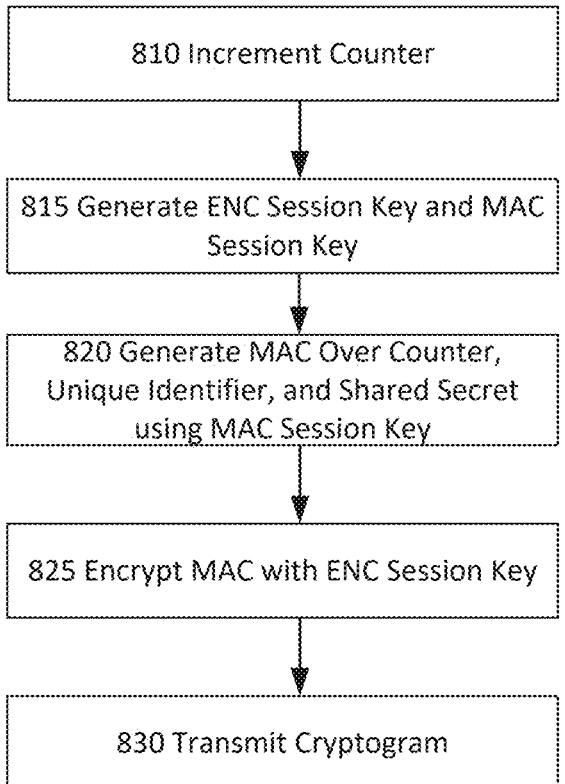
FIG. 8 is a flow chart of a method for generating a cryptogram using a shared secret key on the transaction card side according to an example embodiment.

FIG. 8 is a flow chart of a method 800 for generating a cryptogram using a shared secret key on the transaction card side according to an example embodiment. FIG. 8 may reference the same or similar components as those illustrated in FIGS. 1-7, including a user device, a server, a database, and a contactless card. The method 800 can be implemented in the system 100 and may include, but is not limited to the following steps.

When a transaction is conducted using the card 120, the card 120 can be tapped to the user device 110, as shown in FIG. 7. At step 810, the card 120 may update the counter to increment the counter. The counter can be updated with every conversation between the card 120/the user device 110 and the server 130. The counter may comprise a numeric counter sufficient to store an integer. The card 120 may increment the counter one or more times.

As described above, the card 120 may be provisioned with a master symmetric key. At step 815, the card 120 may use the master symmetric key to generate an encryption session key (ENC session key) and a message authentication code (MAC) session key through an appropriate symmetric cryptographic algorithm, which may include at least one of a symmetric encryption algorithm, HMAC algorithm, and a CMAC algorithm. The ENC session key and the MAC session key may be referred to as diversified keys. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128, a symmetric HMAC algorithm, such as HMAC-SHA-256, and a symmetric CMAC algorithm, such as AES-CMAC.

The card 120 may use the master symmetric key to process the counter to generate the two session keys: the ENC (encryption) session key and the MAC session key. The card 120 may encrypt the counter with the selected symmetric encryption algorithm using the master symmetric key to create the two session keys.

At step 820, the card 120 may generates the MAC over the counter, the unique customer identifier, and the shared secret key using the MAC session key. The shared secret key is generated using the private key of the card 120 and the public key of the server 130 and then stored on the card 120. The customer identifier may comprise a unique alphanumeric identifier assigned to a user of the contactless card, and the identifier may distinguish the user of the contactless card from other contactless card users. In some examples, the customer identifier may identify both a customer and an account assigned to that customer and may further identify the contactless card associated with the customer's account.

At step 825, the card 120 encrypts the MAC with the ENC session key. As encrypted, the MAC can become a cryptogram. In some examples, a cryptographic operation other than encryption may be performed, and a plurality of cryptographic operations may be performed using the diversified symmetric keys prior to transmittal of the protected data.

In some examples, the MAC cryptogram can be a digital signature used to verify user information. Other digital signature algorithms, such as public key asymmetric algorithms, e.g., the Digital Signature Algorithm and the RSA algorithm, or zero knowledge protocols, may be used to perform this verification.

In step 830, the card 120 transmits the cryptogram to the user device 110. The user device 110 may further transmit the cryptogram to the server 130 for validation. The cryptogram can include the applet information of the card 120, the unique customer identifier, the counter, and the encrypted MAC.

Figure 9:
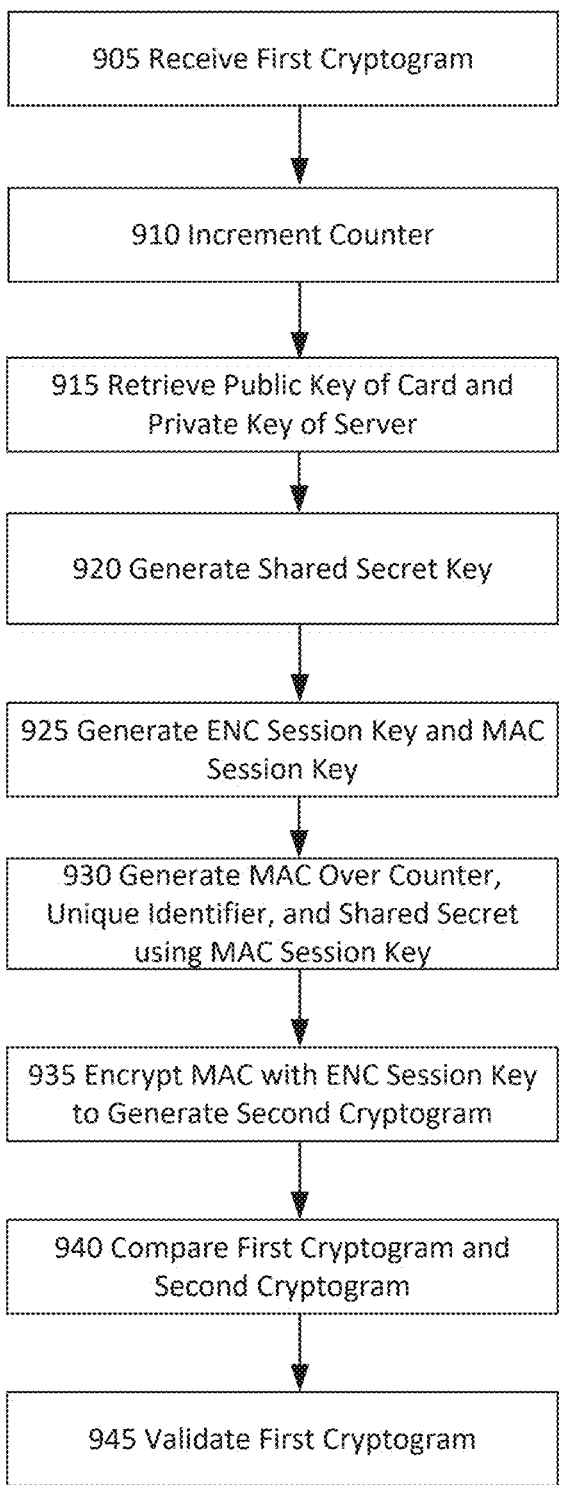
FIG. 9 is a flow chart of a method for validating a cryptogram using a shared secret key on the back end server side according to an example embodiment.

FIG. 9 is a flow chart of a method 900 for validating a cryptogram using a shared secret key on the back end server side according to an example embodiment. FIG. 9 may reference the same or similar components as those illustrated in FIGS. 1-8, including a user device, a server, a database, and a contactless card. The method 900 can be implemented in the system 100 and may include, but is not limited to the following steps.

The user device 110 may transmit to the server 130 a first cryptogram of the card 120 for validation. In step 905, the server receives from the user device 110 the first cryptogram generated by the card 120.

In step 910, the server 130 may increase the counter value associated with the card 120. This counter value may be stored in the database and associated with the card 120 and the user of the card 120.

In step 915, the server 130 may retrieve from the database 140 the public key of the card 120 and the private key of the server 130. The public key of the card 120 was received by server 130 earlier from the user device 110.

In step 920, the server 130 generates the same shared secret key based on the public key of the card 120 and the private key of the server 130. The same shared secret key is generated by a key agreement protocol such as the ECDH encryption method, which is also used by the user device 110 to generate the same shared secret key.

In step 925, the server 130 can use the unique customer identifier of the card 120, the counter value, and/or the master key to generate two session keys: one ENC (encryption) session key and one MAC (message authentication code) session key.

In step 930, the server 130 generates a MAC over the counter, the unique customer identifier, and the shared secret key using the MAC session key.

In step 935, the server encrypts the MAC with the ENC session key. As encrypted, the MAC can become a second cryptogram.

In step 940, the server 130 may compare the first cryptogram with the second cryptogram to determine whether the first cryptogram matches with the second cryptogram.

In step 945, the server 130 may validate the first cryptogram. If the first cryptogram is determined to match with the second cryptogram, the first cryptogram can be validated. The card 120 can be validated accordingly.

FIG. 10 is a flow chart of a method 1000 for dynamically generating a shared secret key between a transaction card and a back end server according to an example embodiment.

FIG. 10 may reference the same or similar components as those illustrated in FIGS. 1-9, including a user device, a server, a database, and a contactless card. The method 1000 can be implemented in the system 100 and may include, but is not limited to the following steps.

In step 1005, a transaction card such as the card 120 is provided. The transaction card is provisioned with a card private key and a card public key derived from the card private key. The transaction card may also be provisioned with a master key for deriving other keys.

In step 1010, a server such as the server 130 is provided. The server is provisioned with a server private key and a server public key derived from the server private key. The server may also be provisioned with a same master key for deriving other key.

In step 1015, a user device such as the user device 110 opens a communication field. The user device 110 can be in data communication with the transaction card and/or the server through the communication field.

In step 1020, the user device receives from the card the card public key. For example, the user device may read the card public key by tapping the card to the user device.

In step 1025, the user device transmits the card public key to the server. The server generates a shared secret key from the card public key and the server private key in accordance with a key agreement protocol. The server may store the shared secret key on a database such as the database 140.

In step 1030, the user device receives from the server the server public key.

In step 1035, the user device transmits the server public key to the transaction card. The transaction card generates the same shared secret key from the server public key and the card private key in accordance with the same key agreement protocol.

In some embodiments, the user device may generate the same shared secret key from the server public key and the card private key in accordance with the same key agreement protocol. The user device may then transmit the same shared secret key to the transaction card.

In some aspects, the techniques described herein relate to a system for generating a shared secret key for a transaction card, the system including: a transaction card including a card private key and a card public key derived from the card private key; a server including a server private key and a server public key derived from the server private key; and a user device configured to: open a communication field, read the card public key, transmit the card public key to the server, wherein the server generates a shared secret key from the card public key and the server private key, receive the server public key from the server, and transmit the server public key to the transaction card, wherein the card generates the same shared secret key from the server public key and the card private key.

In some aspects, the techniques described herein relate to a system, wherein the card stores the shared secret key in a card memory.

In some aspects, the techniques described herein relate to a system, wherein the communication field includes at least one selected from the group of a near field communication (NFC) field, a radio-frequency identification (RFID) field, or Bluetooth.

In some aspects, the techniques described herein relate to a system, wherein the card is newly or recently issued.

In some aspects, the techniques described herein relate to a system, wherein both the card public key and server public key are further derived from a shared common value.

In some aspects, the techniques described herein relate to a system, wherein the shared common value is a unique identifier associated with the card.

In some aspects, the techniques described herein relate to a system, wherein the user device opens a second communication field and receives from the transaction card the shared secret key.

In some aspects, the techniques described herein relate to a system, wherein the server encrypts the shared secret key with a key encryption key, then stores the encrypted shared secret key in a data storage unit.

In some aspects, the techniques described herein relate to a system, wherein prior to storing the key, the server transmits an authentication request to the user device, then receives an authentication credential from the user device.

In some aspects, the techniques described herein relate to a method for generating a shared secret key for a transaction card, the system including: providing a transaction card including a card private key and a card public key derived from the card private key; providing a server including a server private key and a server public key derived from the server private key; opening, by a user device, a communication field; reading, by the user device, the card public key; transmitting, by the user device, the card public key to the server, wherein the server generates a shared secret key from the card public key and the server private key; receiving, by the user device, the server public key from the server; and transmitting, by the user device, the server public key to the transaction card, wherein the card generates the same shared secret key from the server public key and the card private key.

In some aspects, the techniques described herein relate to a method, wherein the communication field includes at least one selected from the group of a near field communication (NFC) field, a radio-frequency identification (RFID) field, or Bluetooth.

In some aspects, the techniques described herein relate to a method, further including authenticating the user device based on the shared secret key.

In some aspects, the techniques described herein relate to a method, further including automatically initiating the key exchange process upon detecting proximity to the transaction card.

In some aspects, the techniques described herein relate to a method, wherein the user device and the transaction card are associated the same user.

In some aspects, the techniques described herein relate to a method, further including requesting an authentication credential from the user associated with the user device before initiating the key exchange process.

In some aspects, the techniques described herein relate to a method, further including generating a unique transaction-specific shared secret key for each transaction.

In some aspects, the techniques described herein relate to a method, wherein the method further includes: receiving, by the user device from the server, a request for the shared secret key; transmitting, by the user device to the server, the shared secret key; and receiving, by the user device from the server, a validation response indicating that the shared secret key from the card matches the shared secret key on the server.

In some aspects, the techniques described herein relate to a method, wherein the method further includes generating a unique session specific shared secret key for each transaction.

In some aspects, the techniques described herein relate to a method, wherein the encryption data includes at least one selected from the group of a unique user identification datum, a unique card datum, or time datum.

In some aspects, the techniques described herein relate to a non-transitory computer readable medium containing computer executable instructions that, when executed by a computer hardware arrangement, cause the computer hardware arrangement to perform procedures including: opening a communication field; reading, from a card upon entering the communication field, the card public key; transmitting, the card public key to a server, wherein the server generates a shared secret key from the card public key and the server private key; receiving, the server public key from the server; and transmitting, the server public key to the transaction card, wherein the card generates the same shared secret key from the server public key and the card private key.

Throughout the disclosure, the terms "bank" or "issuer bank" are used, and it is understood that the present disclosure is not limited to a particular bank or type of bank. Rather, the present disclosure includes any type of bank, account and/or card issuer, or other entity involved in the creation, issuance, or provisioning of accounts or cards associated with accounts.

As used herein, the term "account" is not limited to a particular type of account. Rather, it is understood that the term "account" can refer to a variety of accounts, including without limitation, a financial account (e.g., a credit account, a debit account), a membership account, a loyalty account, a subscription account, a services account, a utilities account, a transportation account, and a physical access account. It is further understood that the present disclosure is not limited to accounts issued by a particular entity.

In some examples, exemplary procedures in accordance with the present disclosure described herein can be performed by a processing arrangement and/or a computing arrangement (e.g., a computer hardware arrangement). Such processing and/or computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of a first device, a user device, a server, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing and/or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing and/or processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

Implementations of the various techniques described herein may be implemented in digital electronic circuitry, or in computer hardware, firmware, software, or in combinations of them. Implementations may be implemented as a computer program product, e.g., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation,"

"various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for generating a shared secret key for a transaction card, the system comprising:
the transaction card comprising a processor and a memory containing a transaction card private key and a transaction card public key derived from the transaction card private key;
a server comprising a processor and a memory containing a server private key and a server public key derived from the server private key; and
a user device comprising a processor and a memory, the user device configured to:
open a communication field,
read the transaction card public key,
transmit the transaction card public key to the server, wherein the server generates a shared secret key from the transaction card public key and the server private key,
receive the server public key from the server, and
transmit the server public key to the transaction card, wherein the transaction card generates the same shared secret key from the server public key and the transaction card private key.

2. The system of claim 1, wherein the transaction card stores the shared secret key in a transaction card memory.

3. The system of claim 1, wherein the communication field comprises at least one selected from the group of a near field communication (NFC) field, a radio-frequency identification (RFID) field, or Bluetooth.

4. The system of claim 1, wherein the transaction card is newly or recently issued.

5. The system of claim 1, wherein both the transaction card public key and the server public key are further derived from a shared common value.

6. The system of claim 5, wherein the shared common value is a unique identifier associated with the transaction card.

7. The system of claim 1, wherein the user device opens a second communication field and receives from the transaction card the shared secret key.

8. The system of claim 1, wherein the server encrypts the shared secret key with a key encryption key, then stores the encrypted shared secret key in a data storage unit.

9. The system of claim 8, wherein prior to storing the encrypted shared secret key, the server transmits an authentication request to the user device, then receives an authentication credential from the user device.

10. A method for generating a shared secret key for a transaction card, comprising:
providing the transaction card comprising a transaction card private key and a transaction card public key derived from the transaction card private key;
providing a server comprising a server private key and a server public key derived from the server private key;
opening, by a user device, a communication field;
reading, by the user device, the transaction card public key;
transmitting, by the user device, the transaction card public key to the server, wherein the server generates a shared secret key from the transaction card public key and the server private key;
receiving, by the user device, the server public key from the server; and
transmitting, by the user device, the server public key to the transaction card, wherein the transaction card generates the same shared secret key from the server public key and the transaction card private key.

11. The method of claim 10, wherein the communication field comprises at least one selected from the group of a near field communication (NFC) field, a radio-frequency identification (RFID) field, or Bluetooth.

12. The method of claim 10, further comprising authenticating the user device based on the shared secret key.

13. The method of claim 10, further comprising automatically initiating a key exchange process upon detecting proximity to the transaction card.

14. The method of claim 10, wherein the user device and the transaction card are associated with the same user.

15. The method of claim 10, further comprising requesting an authentication credential from a user associated with the user device before initiating a key exchange process.

16. The method of claim 10, further comprising generating a unique transaction-specific shared secret key for each transaction.

17. The method of claim 10, further comprising:
receiving, by the user device from the server, a request for the shared secret key;
transmitting, by the user device to the server, the shared secret key; and
receiving, by the user device from the server, a validation response indicating that the shared secret key from the transaction card matches the shared secret key on the server.

18. The method of claim 10, wherein the method further comprises generating a unique session specific shared secret key for each transaction.

19. The method of claim 18, wherein encryption data includes at least one selected from the group of a unique user identification datum, a unique transaction card datum, or time datum.

20. A non-transitory computer readable medium containing computer executable instructions that, when executed by a computer hardware arrangement, cause the computer hardware arrangement to perform procedures for generating a shared secret key for a transaction card comprising:

opening a communication field;

reading, from the transaction card upon entering the communication field, a transaction card public key derived from a transaction card private key;

transmitting the transaction card public key to a server, wherein the server generates a shared secret key from the transaction card public key and a server private key;

receiving, from the server, a server public key derived from the server private key; and transmitting the server public key to the transaction card, wherein the transaction card generates the same shared secret key from the server public key and the transaction card private key.

\*    \*    \*    \*    \*